Patented Sept. 13, 1938

2,129,908

UNITED STATES PATENT OFFICE 2,129,908

SEPARATION OF ORTHO-, META-, AND PARA-PHENYLPHENOLS

Edgar C. Britton, Midland, Mich., assignor to The Dow Chemical Company, Midland, Mich., a corporation of Michigan No Drawing. Application March 27, 1937, Serial No. 133,425

10 Claims. (Cl. 260—705)

The present invention relates to a method for the separation of ortho-, meta-, and para-phenylphenols from mixtures containing all three such compounds and for purification of the individual isomers. It particularly concerns the separation of meta-phenylphenol from para-phenylphenol.

Although certain methods are known for separating ortho- and para-phenylphenols from mixtures thereof, such methods are unsuited to the separation of a mixture of isomeric phenylphenols comprising the meta- isomer. An object of this invention is to provide a method whereby individual phenylphenols may be separated in substantially pure form from a mixture of meta-phenylphenol with either or both of its isomers, e. g. the phenolic mixture obtained by the hydrolysis of a monohalo-diphenyl with aqueous alkali in an iron vessel.

I have now discovered that by fractional distillation of a mixture of ortho-, meta-, and para-phenylphenols the ortho-phenylphenol may be separated in substantially pure form from the metal and para isomers, provided such distillation is carried out at sufficiently reduced pressure. I have also found that the mixture of meta- and para-phenylphenols remaining after the distillation may be separated into its components either by extracting the meta-phenylphenol with an inert organic solvent or by selectively crystallizing para-phenylphenol from a solution of the aforesaid mixture in such solvent. The para-phenylphenol so separated is relatively, but not completely, pure. I have found that it may be rendered highly pure by fractional crystallization as the sodium salt from an aqueous alkaline solution.

The invention, then, consists of the improved method of separating and purifying isomeric phenylphenols hereinafter fully described and particularly pointed out in the claims, the following description setting forth, however, but several of the various ways in which the principle of the invention may be used.

The isomeric phenylphenols have normal boiling points quite close to one another (ortho-phenylphenol 285° C., meta- 321° C., para- 320° C.) and a mixture of any two or more phenylphenols cannot satisfactorily be separated into its components by distillation at atmospheric pressure. However, I have found that when the distillation is carried out at reduced pressure the respective boiling points of the compounds diverge more widely, the interval between them becoming sufficient to permit substantially complete separation of the ortho compound by distillation in usual equipment. For example, at a pressure of 5 millimeters of mercury, the boiling point of ortho-phenylphenol is about 123° C. whereas the meta and para isomers boil together at a temperature of about 172° C. Furthermore, by distilling at reduced pressure any tendency toward decomposition of the compounds is minimized or altogether avoided.

I have also found that whereas meta-phenylphenol is relatively soluble in certain organic solvents over a wide range of temperatures, para-phenylphenol to the contrary is only moderately soluble in such solvents, even at temperatures near the normal boiling points thereof, and is practically insoluble at lower temperatures. In view of these facts I have found that meta-phenylphenol may be separated from a mixture of meta- and para-phenylphenols either by leaching out the meta compound from the mixture with a suitable solvent at a temperature at which the para-compound is substantially insoluble therein or by dissolving the aforesaid phenylphenol mixture in a heated solvent and then cooling the solution to precipitate the para compound. According to either procedure, there are obtained a residue of relatively pure para-phenylphenol and a solution from which pure meta-phenylphenol may be recovered. Among the solvents which I have found useful for the separation of meta- and para-phenylphenols are: carbon tetrachloride, propylene dichloride, ethylene dichloride, chlorbenzene, ortho-dichlorbenzene, tetra-chlorethylene, chloroform, benzene, cyclohexane, and mixtures thereof.

I have also discovered that sodium para-phenylphenolate is very much less soluble in water at moderate temperatures than is sodium meta-phenylphenolate. Therefore, crude para-phenylphenol containing a small proportion of the meta isomer may be purified by fractionally crystallizing the sodium salt of the para compound from aqueous alkaline solutions.

In carrying out my invention I prefer to operate as follows:

A mixture of ortho-, meta-, and para-phenylphenols is fractionally distilled at a reduced pressure, preferably not exceeding 50 millimeters, until the temperature of the distilling vapors becomes higher than the boiling point of ortho-phenylphenol, but is still less than that of the meta- and para-isomers at such reduced pressure; e. g. when the distillation is carried out at 5 millimeters absolute pressure the fraction boiling at temperatures up to about 135° C. is collected. By such procedure there are obtained a distillate consisting of substantially pure ortho-phenylphenol and a still residue consisting of a mixture of meta- and para-phenylphenols.

The mixed meta- and para-phenylphenol residue is dissolved in about two to eight times its weight of a suitable solvent, e. g. ethylene dichloride, at a temperature at or near the normal boiling point of such solvent after which the solution is cooled to about room temperature and allowed to stand. A crystalline precipitate of relatively pure para-phenylphenol forms and is filtered off, washed with fresh cold solvent, and dried. The filtrate is cooled to about 0° C., whereupon additional para-phenylphenol, containing 10–20 per cent by weight of meta-phenylphenol, crystallizes and is removed. The mother liquor remaining after the second crystallization is heated to distill the solvent therefrom, leaving a residue of relatively pure meta-phenylphenol. If desired, this meta-phenylphenol residue may be further purified by recrystallizing from a suitable solvent, e. g. carbon tetrachloride.

Instead of fractionally crystallizing the residue from the original distillation as described above, this residue may be leached with from four to ten times its weight of a suitable solvent, e. g. carbon tetrachloride, which, preferably, is at a temperature above 50° C. The meta-phenylphenol component and a portion of the para-phenylphenol dissolve, leaving a residue of relatively pure para-phenylphenol. The hot solvent leachings are cooled to a temperature of about 30°–40° C., whereby para-phenylphenol dissolved during the leaching is crystallized and removed from the liquor in a form containing about 10–20 per cent of meta-phenylphenol. The remaining liquor is cooled to a temperature of about 10°–15° C. Crystals of substantially pure meta-phenylphenol form, and are filtered off, washed with fresh cold solvent, and dried.

If desired, the partially purified para-phenylphenol separated in either of the ways described above may be rendered highly pure by fractional crystallization of its sodium salt. In carrying out such crystallization, the para-phenylphenol is heated with sufficient 5–15 per cent aqueous sodium hydroxide solution to dissolve the same. The solution thus formed is cooled to about 0° C., whereupon sodium para-phenylphenolate crystallizes. The crystals are filtered off, washed with cold water, and dissolved in hot water, and the resultant solution is acidified. Substantially pure para-phenylphenol precipitates, and is removed by filtration, washed with cold water, and dried.

The following examples illustrate ways in which the principle of the invention has been applied, but are not to be construed as limiting the invention:—

*Example 1*

A mixture of 100 grams each of ortho-phenylphenol (F. P. 56°–57° C.), meta-phenylphenol (F. P. 77°–78° C.) and para-phenylphenol (F. P. 164°–165° C.) is fractionally distilled at an absolute pressure of 5 millimeters of mercury, the fraction distilling at temperatures between 118° and 135° C. being collected. Distillation is stopped when the temperature of the vapors reaches 160° C. In this way there is obtained about 95 grams of the fraction distilling at 118°–135° C., which fraction consists of approximately 98 per cent pure ortho-phenylphenol freezing at 59° C. or thereabout. Approximately 199 grams of mixed meta- and para-phenylphenol remains in the still.

This 199 gram phenylphenol residue is dissolved in 1.1 liters of warm ethylene dichloride, and the solution so produced is cooled to about 20° C., whereupon a crystalline precipitate forms and is removed by filtration and dried. This precipitate consists of 79.2 grams of para-phenylphenol having a freezing point of 160°–162° C. and containing about 5 per cent of meta-phenylphenol. The remaining mother liquor is further cooled to about 3° C., whereby an additional 22.8 grams of crude para-phenylphenol crystallizes out and is removed and dried. This latter material has a freezing point of 148°–157° C. and contains about 18 per cent of meta-phenylphenol.

The mother liquor remaining after the last mentioned crystallization is heated to distill ethylene dichloride therefrom, leaving a residue containing chiefly meta-phenylphenol. This residue is dissolved in 0.3 liter of hot carbon tetrachloride, and the solution so produced is then cooled to a temperature of 10°–15° C., whereupon meta-phenylphenol crystallizes. The crystalline product is removed by filtration and dried. There is thus obtained 82.8 grams of 99–100 per cent pure meta-phenylphenol having a freezing point of 78.8°–79° C.

*Example 2*

A mixture of ortho-, meta-, and para-phenylphenols is recovered from a product formed by hydrolyzing an equimolecular mixture of ortho- and para-chlordiphenyls with aqueous sodium hydroxide in an iron autoclave. 618 grams of this phenylphenol mixture is fractionally distilled at 5 millimeters pressure according to the procedure of Example 1, whereby a distillate of 62.0 grams of 98 per cent pure ortho-phenylphenol having a freezing point of 59° C., and an undistilled residue of 552 grams of mixed meta- and para-phenylphenols are obtained.

This 552 grams residue is leached with 3.0 liters of carbon tetrachloride at a temperature of about 76° C., leaving as the undissolved residue 100 grams of 95 per cent pure para-phenylphenol having a freezing point of 159.5°–161.5° C. The carbon tetrachloride leachings are cooled to 39° C., whereby para-phenylphenol, dissolved during the leaching operation, is crystallized, leaving the meta-phenylphenol in solution. The crystals are removed by filtration, washed with cold carbon tetrachloride, and dried, thus obtaining approximately 113 grams of crude para-phenylphenol having a freezing point of 146°–150° C. and containing about 20 per cent meta-phenylphenol.

The mother liquor from the last mentioned crystallization is then cooled to a temperature of 10°–15° C. to crystallize the meta-phenylphenol which is then removed and dried. In this way approximately 246 grams of 99–100 per cent pure meta-phenylphenol having a freezing point of 78.5°–79° C. is obtained.

*Example 3*

A mixture of 79.2 grams of partially purified para-phenylphenol (containing about 5 per cent of meta-phenylphenol) and 187 c. c. of a 10 per cent aqueous sodium hydroxide solution is heated to a temperature of about 100° C. to dissolve all of the phenylphenol. The hot solution is then cooled to 5° C., whereby crystallization of the sodium para-phenylphenolate occurs. The crystals are filtered off, washed with cold water, and redissolved in boiling water. The resultant solution is acidified with dilute sulphuric acid, whereby para-phenylphenol is precipitated. The precipitate is removed, washed with cold water, and dried. 66.0 grams of para-phenylphenol having a freezing point of 163.5°–164° C. and a purity of 99–100 per cent is obtained.

Other modes of applying the principle of my invention may be employed instead of the ones explained, change being made as regards the method herein disclosed, provided the step or steps stated by any of the following claims or the equivalent of such stated step or steps be employed.

I, therefore, particularly point out and distinctly claim as my invention:—

1. The method of separating ortho-, meta-, and para-phenylphenols from a mixture thereof which comprises fractionally distilling ortho-phenylphenol from the mixture under reduced pressure, treating the still residue with a solvent in which meta-phenylphenol is relatively soluble and para-phenylphenol is relatively insoluble to form a solution containing chiefly meta-phenylphenol and a solid residue or precipitate consisting chiefly of para-phenylphenol, and recovering meta-phenylphenol from the solution thereof.

2. The method of separating ortho-, meta-, and para-phenylphenols from a mixture thereof which comprises fractionally distilling ortho-phenylphenol from the mixture under reduced pressure, dissolving the still residue by heating with a solvent in which meta-phenylphenol is relatively soluble and para-phenylphenol is relatively insoluble, crystallizing said para compound by cooling the solution, and recovering meta-phenylphenol from the mother liquor of such crystallization.

3. The method of separating ortho-, meta-, and para-phenylphenols from a mixture thereof which comprises fractionally distilling ortho-phenylphenol from the mixture under reduced pressure, dissolving the still residue by heating with a solvent in which meta-phenylphenol is relatively soluble and para-phenylphenol is relatively insoluble, crystallizing para-phenylphenol by cooling the solution, distilling off the solvent from the mother liquor of such crystallization, whereby a residue of meta-phenylphenol is obtained, and purifying such meta-phenylphenol by recrystallization from an organic solvent.

4. The method of separating ortho-, meta-, and para-phenylphenols from a mixture thereof which comprises fractionally distilling ortho-phenylphenol from the mixture under reduced pressure, leaching the still residue with a solvent in which meta-phenylphenol is relatively soluble and para-phenylphenol is relatively insoluble, and fractionally crystallizing first para-phenylphenol and then meta-phenylphenol from the leachings.

5. The method of separating ortho-, meta-, and para-phenylphenols from a mixture thereof which comprises fractionally distilling ortho-phenylphenol from the mixture at an absolute pressure not greater than 50 millimeters of mercury, dissolving the still residue by heating with ethylene dichloride, crystallizing para-phenylphenol by cooling the solution, distilling off ethylene dichloride from the mother liquor of such crystallization, whereby a residue of meta-phenylphenol is obtained, and purifying such meta-phenylphenol by recrystallization from an organic solvent.

6. The method of separating ortho-, meta-, and para-phenylphenols from a mixture thereof which comprises fractionally distilling ortho-phenylphenol from the mixture at an absolute pressure not greater than 50 millimeters of mercury, leaching the still residue with carbon tetrachloride and fractionally crystallizing first para-phenylphenol and then meta-phenylphenol from the leachings.

7. The method of separating meta- and para-phenylphenols from a mixture consisting chiefly of said compounds which comprises treating the mixture with a solvent in which meta-phenylphenol is relatively soluble and para-phenylphenol is relatively insoluble to form a solution containing chiefly meta-phenylphenol and a solid residue or a precipitate consisting chiefly of para-phenylphenol and recovering meta-phenylphenol from the solution thereof.

8. The method of separating meta- and para-phenylphenols from a mixture consisting chiefly of said compounds which comprises dissolving the mixture by heating with a solvent in which meta-phenylphenol is relatively soluble and para-phenylphenol is relatively insoluble, crystallizing the para- compound by cooling such solution, and recovering meta-phenylphenol from the mother liquor of such crystallization.

9. The method of separating meta- and para-phenylphenols from a mixture consisting chiefly of said compounds which comprises dissolving the mixture by heating with ethylene dichloride, crystallizing the para- compound by cooling such solution, and recovering meta-phenylphenol from the mother liquor of such crystallization.

10. The method of separating meta- and para-phenylphenols from a mixture consisting chiefly of said compounds which comprises leaching the mixture with carbon tetrachloride and recovering meta-phenylphenol from such leachings.

EDGAR C. BRITTON.